United States Patent [19]

Malm

[11] Patent Number: 5,149,478
[45] Date of Patent: Sep. 22, 1992

[54] FORMING DECORATIVE TRIM STRIPS FROM CONTINUOUS EXTRUSIONS

[75] Inventor: Douglas N. Malm, Brecksville, Ohio

[73] Assignee: The Standard Products Company, Cleveland, Ohio

[21] Appl. No.: 793,585

[22] Filed: Nov. 18, 1991

[51] Int. Cl.$^5$ ............................................. B29C 47/06
[52] U.S. Cl. ................................. 264/162; 264/296; 156/153; 156/196; 156/256
[58] Field of Search ............... 264/132, 135, 136, 137, 264/138, 139, 145, 146, 148, 151, 157, 158, 159, 160, 162, 163, 245, 246, 248, 249, 250, 260, 167, 171, 176.1, 177.1, 177.17, 210.1, 210.2, 211.12, 294, 295, 296, 319, 320; 156/153, 63, 196, 216, 217, 219, 220, 221, 222, 223, 242, 250, 251, 253, 254, 256, 257, 258, 260, 268

[56] References Cited

U.S. PATENT DOCUMENTS

| | | | |
|---|---|---|---|
| 4,088,721 | 5/1978 | Apicella, Jr. | 264/151 |
| 4,547,954 | 10/1985 | Van Manen | 264/139 |
| 4,585,600 | 4/1986 | Rollyson et al. | 264/148 |
| 4,865,796 | 9/1989 | Tamura et al. | 264/167 |
| 4,904,434 | 2/1990 | Hyer | 264/177.1 |
| 5,009,825 | 4/1991 | Lurie | 264/210.2 |

Primary Examiner—Jay H. Woo
Assistant Examiner—Robert B. Davis
Attorney, Agent, or Firm—Harness, Dickey & Pierce

[57] ABSTRACT

A method of forming elongated trim strips having a central body section of a desired predetermined constant cross-sectional configuration with an integral contoured end joined to the central body section including by using a length of extruded thermoplastic material having the desired predetermined constant cross-sectional configuration with a show face surface and a back mounting surface. Material is removed from the back side of the extruded length to provide an end portion on the strip which tapers in thickness from the original extruded thickness to a minimum thickness at the end of the length. Thereafter, a rigid and relatively flat backing strip is provided and the extruded length is deflected to bring the back side of the tapered thickness end portion of the length into engagement with the backing strip. The back side of the extruded length including the tapered thickness end portion is then bonded to the backing strip which maintains the strip in a relatively flat condition.

8 Claims, 2 Drawing Sheets

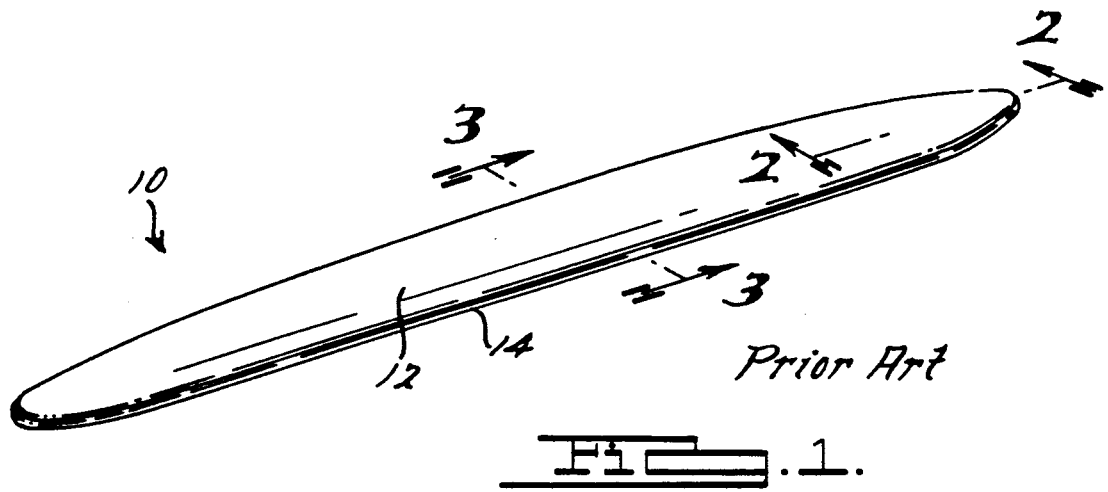
Fig. 1. *Prior Art*
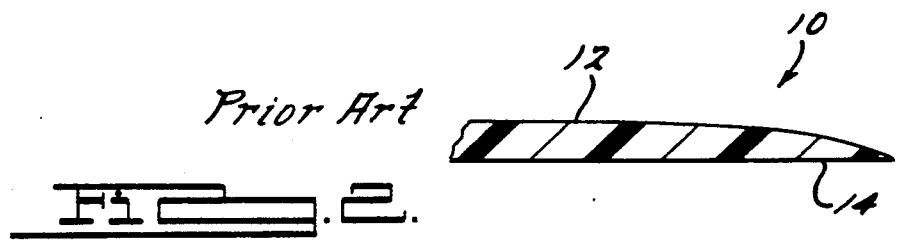
Fig. 2. *Prior Art*
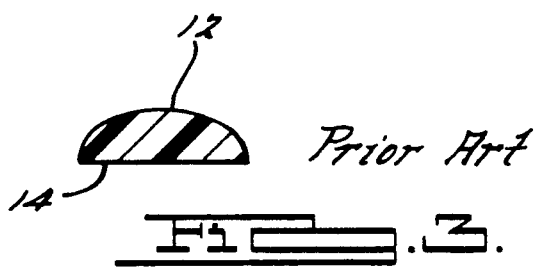
Fig. 3. *Prior Art*
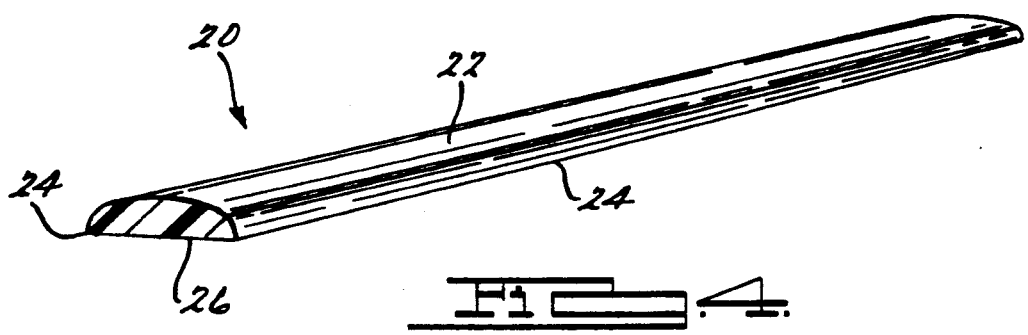
Fig. 4.

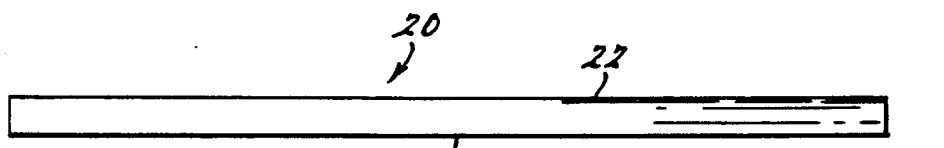
FIG. 5A.
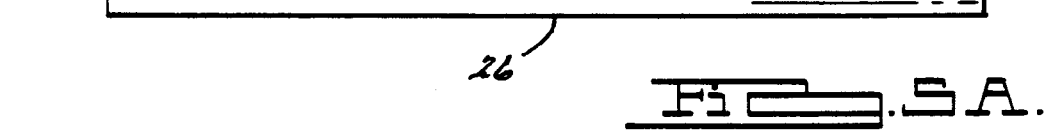
FIG. 5B.
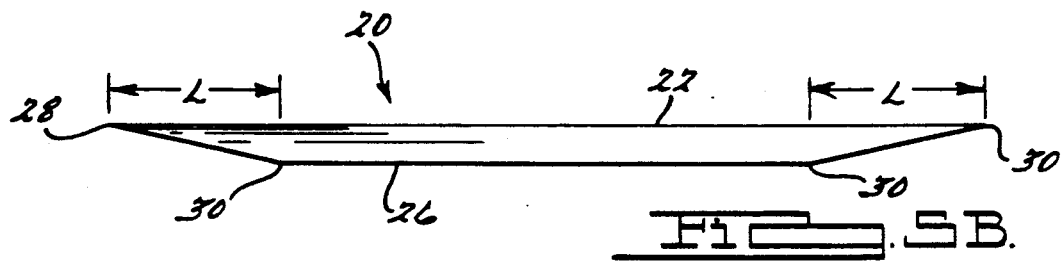
FIG. 5C.
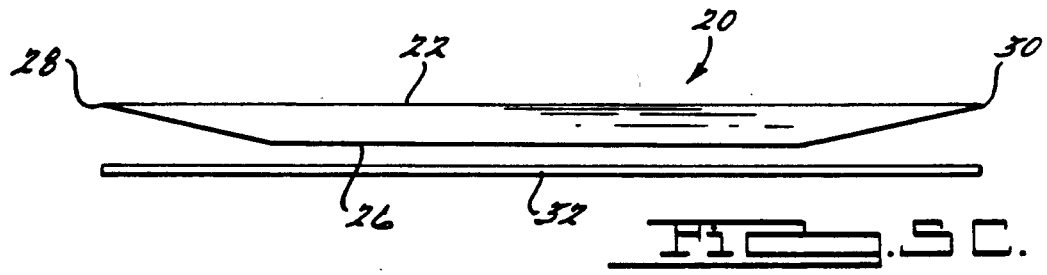
FIG. 5D.
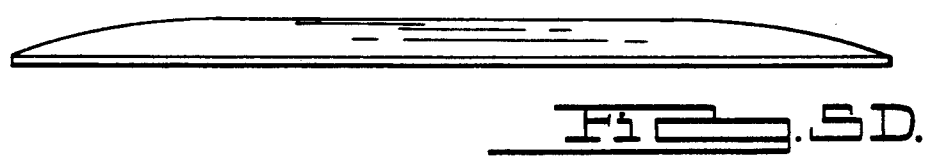
FIG. 6.
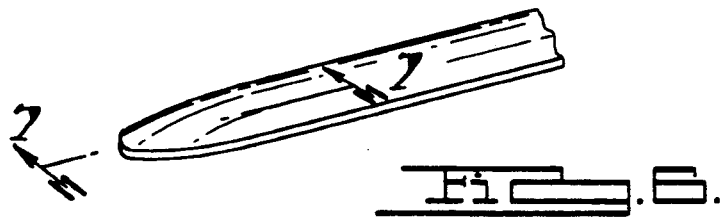
FIG. 7.

FORMING DECORATIVE TRIM STRIPS FROM CONTINUOUS EXTRUSIONS

BACKGROUND OF THE INVENTION

The subject invention is directed toward the art of forming products from plastic materials and, more particularly, to a method of forming elongated, decorative strip products from thermoplastics.

The invention is especially suited for forming decorative and protective trim strips of the type applied to vehicle body panels and will be described with reference thereto; however, the invention is capable of broader application and could be used for forming similar products for other uses.

Decorative and protective trim strips of the type typically applied to the exterior surfaces of automotive vehicle body panels have been formed using many techniques. When formed from thermoplastic materials, both injection molding and extrusion processes have been used. The extrusion process offers the possibility of high production rates with relatively low tooling costs as compared to injection molding. It does, however, have certain significant disadvantages. The primary disadvantage is that the end of the extruded strip cannot have smoothly tapering contours as can readily be obtained with injection molding.

In an effort to overcome the noted disadvantage, separately molded end pieces have been joined to extruded center sections. This has not been a fully satisfactory solution since a noticeable joint line results. Further, with many plastics, especially those with metal flake type colorants, it is nearly impossible to obtain a good color match between the extruded central section and the molded end sections.

BRIEF STATEMENT OF THE INVENTION

The subject invention overcomes the noted problems and provides a method of using extruded lengths of thermoplastic to form decorative trim strips with contoured ends. The method of the invention allows the contoured ends to be an integral section of the main body of the decorative trim strip. Use of the method does not affect the decorative outer show face surface of the strip.

In accordance with the invention, there is provided a method particularly suited for forming elongated, decorative trim strips having contoured ends and a predetermined cross-sectional configuration comprising providing a length of thermoplastic material having a uniform cross-section in planes perpendicular to its longitudinal axis and a length at least as great as the desired decorative trim strip. The length is selected to have a decorative show face side and a relatively flat back mounting side. From the back side of the length adjacent an end thereof, material is removed to cause the end portion of the length to gradually reduce in thickness from the original extruded thickness to a minimum thickness closely adjacent the associated end. Thereafter, a relatively rigid end, relatively flat backing strip is provided and the extruded length with the tapered end portion is placed in engagement therewith and the end portion is deflected to bring the back side into engagement with the backing strip. The back side of the extruded length including the end portion is then bonded to the backing strip to produce a finished trim strip having the desired contoured ends. In this way, the advantages of using the continuously extruded strip material are obtained without the disadvantages of connecting molded, contoured end pieces thereto. By the use of the subject method, smoothly contoured and decoratively shaped ends are achieved without affecting the decorative surface face of the strip.

By varying the angles at which the end portions are tapered, as well as the length of the taper, it is possible to achieve a variety of different end portion contours.

In addition to the above, it is preferable that the extruded length provided have a contoured outer face of a generally convex configuration. This allows a more pleasing end formation to be achieved from the taper end removal operations.

In accordance with a further aspect of the invention, the material removed from the ends of the extruded length is removed so that each end has a uniform taper of a predetermined angle of taper. Additionally, the thickness of the terminal end of each end portion is preferably substantially zero.

As is apparent from the foregoing, a primary object of the invention is the provision of a method which allows contoured and tapered end portions to be provided on the terminal ends of extruded lengths of plastic material.

A further object is the provision of a method of the type described wherein the decorative face side of the extruded lengths are not damaged or affected by the contoured end formation.

Yet another object of the invention is the provision of a method of the type described which can be carried out rapidly and without the use of special tooling or the like.

BRIEF DESCRIPTION OF THE DRAWINGS

The above and other objects and advantages will become apparent from the following description when read in conjunction with the accompanying drawings wherein:

FIG. 1 is a pictorial view of a typical prior art decorative trim strip molded from a thermoplastic resin;

FIGS. 2 and 3 are cross-sectional view taken through lines 2—2 and 3—3, respectively of the prior art trim strip of FIG. 1;

FIG. 4 is a pictorial view of a length of extruded thermoplastic material to which the subject method is applicable;

FIGS. 5A through 5D are pictorial showings of the sequence of method steps used for practicing the subject invention;

FIG. 6 is a pictorial view of an end portion of a decorative trim strip formed in accordance with the method steps of FIGS. 5A through 5D; and, FIG. 7 is a cross-sectional view taken on line 7—7 of FIG. 6.

DETAILED DESCRIPTION OF THE PREFERRED EMBODIMENT

Referring more particularly to the drawings wherein the showings are for the purpose of illustrating the preferred method of practicing the invention and not for the purpose of limiting same, FIGS. 1 through 3 illustrate a typical prior art decorative trim strip 10 of the type often used to protective and/or provide a decorative accent to the side panel of a automotive vehicle. Strips of the type shown in FIGS. 1 through 3 are typically injection molded in multiple cavity dies and generally comprise an exterior decorative face surface 12 which can be shaped and contoured in any desired manner. The opposite face 14 of the strip is generally a mounting surface and normally has a relatively flat configuration. As can be seen from FIGS. 2 and 3, the decorative face surface 12 is preferably contoured to provide a pleasing external appearance and to assure that when in the mounted position, the peripheral edges closely engage the surface to which the trim strip is joined. Additionally, the ends of the strip are preferably contoured to gently taper toward the end and to avoid any abrupt thickness changes or other irregularities.

As previously mentioned, the formation of such decorative trim strips using injection molding techniques is relatively straight forward and well known. Through the use of such injection molding techniques, the various contours and shapes required for the external face surface of the strip can be achieved relatively easily. As is also well known, however, the cost of the forming dies and associated equipment necessary for molding these strips can be substantial.

According to the subject invention, strips of the general type shown and described with reference to the prior art showings of FIGS. 1 through 3 can be relatively effectively and efficiently achieved from a constant cross-section extruded length of thermoplastic material as illustrated in FIG. 4. As can be appreciated, FIG. 4 is merely a typical strip which could be used for practicing the subject invention. As shown in FIG. 4, the strip 20 has an outer face surface 22 which is contoured with a generally convex configuration and joins along its peripheral edges 24 to a relatively flat back surface 26. The back surface 26 provides the mounting surface and the opposed surface 22 provides the decorative face or show surface. This type of strip can be formed using conventional single material extrusion techniques or it can be co-extruded so that the outer decorate surface 22 is formed from a separate material having specific metal flake colorants or the like included therein while the back and main body portion of the strip is formed from an uncolored or differing thermoplastic. In any event, the strips of the form generally shown in FIG. 4 are, according to the invention, provided with contoured ends through a sequence of steps best described with reference to FIGS. 5A through 5D. As illustrated in FIG. 5A, a length of the extruded strip 20 at least as great and the length of the desired final trip strip is provided to serve as the starting point for the subject method.

The length of extruded thermoplastic strip material is, as noted, selected to be at least as long as the desired final length of trim strip to be formed. Adjacent each end of the strip, material is removed so that each end portion tapers in thickness from the original extruded thickness to a thin, minimum thickness adjacent each terminal end. The actual length over which the ends of the strip are tapered could vary substantially but is selected depending upon the particular end configuration which is ultimately desired. The tapered length is shown and designed with an L in FIG. 5B. As shown therein, the taper at each end is uniform and ends in a feather thickness at the ultimate terminal end 28 or 30. Additionally, at the point where the tapered surface joins the back side 26, it is illustrated as having a corner 30. At this corner 30, it should be appreciated that it would be possible, and under certain circumstances desirable, to round or smooth this area for reasons which will subsequently become apparent.

With the ends formed as described, the extruded length is brought into general alignment with a backing strip 32 as illustrated in FIG. 5C. The backing strip 32 is a relatively thin, rigid length of plastic such as polystyrene or polyvinylchloride. Its length and width are preferably substantially equal to the length and width of the extruded length. The two strips, i.e., the length 20 and the rigid backing strip 32, are placed in alignment as shown in FIG. 5C and the back 26 brought into engagement with the top surface of the strip 32. Thereafter, the end portions with their tapering back surface are deflected into engagement with the surface of the backing strip 32 and the two strips bonded together.

Many different types of bonding materials or techniques could be used including solvents, cements, and the like. Preferably, the backing strip is sufficiently rigid and of sufficient strength to maintain the strip 20 in the deflected, flat condition shown in FIG. 5D. Because of the tapered severing of the back strip and the convex shape of the extruded length, the end portions take on a contoured shape generally as illustrated in FIGS. 6 and 7. This provides a highly pleasing and decorative end treatment for the extruded trim strip structure.

As can readily be appreciated, the actual shape and end configuration which results from the cutting and deflecting operation will depend upon not only the angle at which the end is tapered, but also the general configuration of the exposed face surface. Because the entire operation takes place without cutting or disturbing the external face or decorative surface, the resulting trim strip is of smooth and uniform surface and coloration. Additionally, because the cutting and bonding take place only on the back or mounting surface, it is possible to use the method with those extruded strips formed with only a thin outer decorative surface, such as co-extruded strips or those which have been given a decorative surface treatment.

The method by which the end taper is made could vary with the use of any particular types of known cutting operations, from simple sanding and abrading to more elaborate machine cutting, sawing, and the like. Additionally, as can be appreciated, by varying the angle and the cut at each end of the strip, the ends can be made to have differing contours and peripheral configurations to meet varying needs or aesthetic requirements.

The invention has been described with reference to the preferred embodiment. Obviously, modifications and alterations will occur to others upon a reading and understanding of this specification. It is intended to include all such modifications and alterations insofar as they come within the scope of the appended claims or the equivalents thereof.

Having thus described the invention, it is claimed:

1. A method of forming an elongated trim strip having contoured ends and a predetermined cross-sectional configuration comprising:
   providing an extruded length of thermoplastic material to have a uniform cross-section in planes perpendicular to its longitudinal axis and a length at least as great as the desired trim strip, said extruded length having a face side and a back side;
   removing material from the back side of the length adjacent the ends thereof to cause each end portion of the length to gradually reduce in thickness from the original extruded thickness to a minimum thickness closely adjacent the associated end;

providing a rigid and relatively flat backing strip and defelecting the extruded length to bring the back side of the reduced thickness end portions into engagement with the backing strip and bonding the back side of the extruded length including the end portions to the backing strip to produce a finished trim strip having contoured ends.

2. The method as defined in claim 1 wherein each end portion is uniformly reduced in thickness.

3. The method as defined in claim 1 wherein the length of thermoplastic material has a generally flat back side and a contoured face side.

4. The method as defined in claim 1 wherein the face side of the length has a convex configuration.

5. The method as defined in claim 1 wherein the length of thermoplastic material is cut to the desired final trim strip length prior to reducing the thickness of each end portion.

6. The method as defined in claim 1 wherein said backing strip is selected to be sufficiently stiff and rigid as to be capable of maintaining said length in a flat condition.

7. A method of forming elongated trim strips having a central body section of a desired predetermined constant cross-sectional configuration of uniform size in planes perpendicular to its longitudinal axis with an integral contoured end joined to the central body section, said method comprising the steps of:

providing a length of extruded thermoplastic material having the said desired predetermined constant cross-sectional configuration with a face surface and a back surface;

removing material from the back side of the extruded length to provide an end portion of the strip which tapers in thickness from the original extruded thickness to a minimum thickness at the end of the length;

providing a rigid and relatively flat backing strip and deflecting the extruded length to bring the back side of the tapered thickness end portion of the length into engagement with the backing strip and bonding the back side of the extruded length including the tapered thickness end portion to the backing strip.

8. The method as defined in claim 7 wherein the length of extruded thermoplastic material has a length at least as great as the desired final length of trim strip desired and the backing strip extends throughout the entire length thereof.

* * * * *